US011507826B2

(12) United States Patent
Rohanimanesh et al.

(10) Patent No.: US 11,507,826 B2
(45) Date of Patent: Nov. 22, 2022

(54) COMPUTERIZED IMITATION LEARNING FROM VISUAL DATA WITH MULTIPLE INTENTIONS

(71) Applicant: Osaro, San Francisco, CA (US)

(72) Inventors: Khashayar Rohanimanesh, San Francisco, CA (US); Aviv Tamar, Berkeley, CA (US); Yinlam Chow, San Mateo, CA (US)

(73) Assignee: Osaro, San Francisco, CA (US)

( * ) Notice: Subject to any disclaimer, the term of this patent is extended or adjusted under 35 U.S.C. 154(b) by 674 days.

(21) Appl. No.: 16/528,055

(22) Filed: Jul. 31, 2019

(65) Prior Publication Data

US 2020/0042874 A1 Feb. 6, 2020

Related U.S. Application Data

(60) Provisional application No. 62/713,129, filed on Aug. 1, 2018.

(51) Int. Cl.
*G06N 3/08* (2006.01)
(52) U.S. Cl.
CPC ..................................... *G06N 3/08* (2013.01)
(58) Field of Classification Search
CPC ...... G06N 3/08; G06N 3/0454; G06N 3/0472; G06N 3/0481; G06N 3/088
See application file for complete search history.

(56) References Cited

U.S. PATENT DOCUMENTS

2016/0048741 A1* 2/2016 Nguyen ................. G06V 20/52
382/155
2019/0332920 A1* 10/2019 Sermanet ............. G06K 9/6234

OTHER PUBLICATIONS

Tamar, A., et al., "Imitation Learning from Visual Data with Multiple Intentions," Conference Paper, ICLR, pp. 1-17 (Feb. 15, 2018).
Abbeel, P., et al., "Apprenticeship Learning via Inverse Reinforcement Learning," ICML '04 Proceedings of the Twenty-First International Conference on Machine Learning; Banff, Alberta, Canada, pp. 1-8 (Jul. 4-8, 2004).
Arora, S., et al. "Do GANs actually learn the distribution? An empirical study," ArXiv preprint, arXiv:1706.08224, pp. 1-11 (Jul. 4, 2017).
Babes-Vroman, M., et al., "Apprenticeship learning about multiple intentions," In ICML, ACM, pp. 1-8 (2011).
Bishop, C.M., "Mixture density networks," Technical report, published by Aston University, pp. 1-26 pages (Feb. 1994).
Chebotar, Y., et al., "Generalizing Regrasping with Supervised Policy Learning," Conference Paper, International Symposium on Experimental Robotics (ISER), pp. 1-10 (Jan. 2016).

(Continued)

*Primary Examiner* — Jean B Jeanglaude
(74) *Attorney, Agent, or Firm* — Blueshift IP, LLC; Robert Plotkin

(57) ABSTRACT

A computer system uses Learning from Demonstration (LfD) techniques in which a multitude of tasks are demonstrated without requiring careful task set up, labeling, and engineering, and learns multiple modes of behavior from visual data, rather than averaging the multiple modes. As a result, the computer system may be used to control a robot or other system to exhibit the multiple modes of behavior in appropriate circumstances.

18 Claims, 2 Drawing Sheets

(56) References Cited

OTHER PUBLICATIONS

Correll, N., et al., "Lessons from the Amazon Picking Challenge," Journal of Latex Class Files, vol. 6, No. 1, pp. 1-14 (Jan. 2007).
Dimitrakakis, C., et al., "Bayesian multitask inverse reinforcement learning," In: Sanner S., Hutter M. (eds) Recent Advances in Reinforcement Learning. EWRL 2011 Lecture Notes in Computer Science, vol. 7188, pp. 1-14 (2011).
Finn, C., et al., "Guided Cost Learning: Deep Inverse Optimal Control via Policy Optimization," In ICML, pp. 1-13 (May 27, 2016).
Fragkiadaki, K., et al., "Motion prediction under multimodality with conditional stochastic networks," ArXiv preprint, arXiv:1705.02082, pp. 1-9 (May 5, 2017).
Giusti, A., et al., "A Machine Learning Approach to Visual Perception of Forest Trails for Mobile Robots," IEEE Robotics and Automation Letters, vol. 1 , Np. 2, pp. 1-7 (Jul. 2016).
Glynn, P.W., et al., "Importance sampling for Monte Carlo estimation of quantiles," Proceedings of the Second International Workshop on Mathematical Methods in Stochastic Simulation and Experimental Design, pp. 1-7 (1996).
Goodfellow, I.J., et al., "Generative adversarial nets," In NIPS, pp. 1-9 (2014).
Hausman, K., et al., "Multi-Modal Imitation Learning from Unstructured Demonstrations using Generative Adversarial Nets," ArXiv preprint, arXiv:1705.10479, pp. 1-11 (2017).
Jonathan, H., et al., "Generative adversarial imitation learning," In NIPS, pp. 1-14 (2016).
Hong, L.J., et al., Simulating Sensitivities of Conditional Value at Risk, Management Science, vol. 55, No. 2, pp. 281-293 (Feb. 2009).
Kingma, D.P., et al., "Adam: A Method for Stochastic Optimization," ArXiv preprint, arXiv:1412.6980, pp. 1-15, (Jan. 30, 2017).
Kingma, D.P., et al., "Auto-encoding variational bayes," ArXiv preprint, arXiv:1312.6114, pp. 1-14 (May 2014).
Levine, S., et al., "Learning contact-rich manipulation skills with guided policy search," ArXiv preprint, arXiv:1501.05611, pp. 1-8 (Feb. 2015).
Li, Y., et al., "Inferring the latent structure of human decision-making from raw visual inputs," ArXiv preprint arXiv:1703.08840, pp. 1-11 (Mar. 2017).
Mirza, M., et al., "Conditional generative adversarial nets," ArXiv preprint arXiv:1411.1784, pp. 1-7 (Nov. 2014).
Mülling, K., et al., "Learning to select and generalize striking movements in robot table tennis," The International Journal of Robotics Research, vol. 32, No. 3, pp. 1-24 (Jan. 30, 2013).
Neal, R.M., "Connectionist learning of belief networks," Artificial intelligence, vol. 56, No. 1, pp. 71-113 (1992).
Neal, R.M., et al., "A view of the EM algorithm that justifies incremental, sparse, and other variants," In Learning in graphical models, vol. 89, pp. 355-368 (1998).
Ng, A.Y., et al., "Algorithms for inverse reinforcement learning," In ICML, pp. 1-8 (2000).
Pastor, P., et al., "Learning and generalization of motor skills by learning from demonstration," 2009 IEEE International Conference on Robotics and Automation, pp. 1-6 (2009).
Pillai, M., et al., "Towards visual ego-motion learning in robots," ArXiv preprint arXiv:1705.10279, pp. 1-8 (May 2017).
Pomerleau, D.A., et al., "ALVINN: An autonomous land vehicle in a neural network," In NIPS, pp. 305-313 (1989).
Rahmatizadeh, R., et al., "Vision-based multi-task manipulation for inexpensive robots using end-to-end learning from demonstration," 2018 IEEE International Conference on Robotics and Automation (ICRA), pp. 1-8 (2017).
Rockafellar, R.T., et al., "Optimization of conditional value-at-risk," Journal of Risk, vol. 2, pp. 1-26 (2000).
Ross, S., et al., "A reduction of imitation learning and structured prediction to no-regret online learning," In AISTATS, pp. 627-635 (2011).
Schaal, S., et al., "Computational approaches to motor learning by imitation," Phil. Trans. of the Royal Society of London: Biological Sciences, vol. 358, pp. 537-547 (2003).
Schaal, S., et al., "Learning movement primitives," Robotics Research, pp. 1-10 (2005).
Sohn, K., et al., "Learning structured output representation using deep conditional generative models," In NIPS, pp. 1-9 (2015).
Tang, Y., et al., "Learning stochastic feedforward neural networks," In NIPS, pp. 1-9 (2013).
Wang, Z., et al., "Robust imitation of diverse behaviors," arXiv preprint arXiv:1707.02747, pp. 1-12 (2017).
Xu, K., et al., "Show, attend and tell: Neural image caption generation with visual attention," In ICML, arXiv:1502.03044, pp. 1-22 (2015).
Ziebart, B.D., et al., "Maximum entropy inverse reinforcement learning," In AAAI, vol. 8, pp. 1433-1438 (2008).

\* cited by examiner

COMPUTERIZED IMITATION LEARNING FROM VISUAL DATA WITH MULTIPLE INTENTIONS

BACKGROUND

Machine learning may be used to develop systems for controlling robots. Recent advances in "learning from demonstrations" (LfD) with deep neural networks have been capable of learning complex robot skills that involve high dimensional perception, such as raw image inputs. LfD algorithms generally assume learning from single task demonstrations. In practice, however, it is more efficient for a teacher to demonstrate a multitude of tasks without careful task set up, labeling, and engineering. Unfortunately, in such cases, traditional imitation learning techniques often result in sub-optimal behavior.

SUMMARY

A computer system uses Learning from Demonstration (LfD) techniques in which a multitude of tasks are demonstrated without requiring careful task set up, labeling, and engineering, and learns multiple modes of behavior from visual data, rather than averaging the multiple modes. As a result, the computer system may be used to control a robot or other system to exhibit the multiple modes of behavior in appropriate circumstances.

Other features and advantages of various aspects and embodiments of the present invention will become apparent from the following description and from the claims.

DETAILED DESCRIPTION

As described above, traditional learning from demonstrations (LfD) techniques in which a multitude of tasks are demonstrated without careful task set up, labeling, and engineering, often result in sub-optimal behavior. One reason for this is that such techniques fail to represent the multi-modal nature of the data. For example, consider a driving demonstration in which the human driver turns to the right 50% of the time and turns to the left 50% of the time when swerving to avoid an oncoming vehicle. In this example, turning to the right is one behavior mode and turning to the left is another behavior mode. Traditional LfD techniques would average these two modes and "learn" to continue driving straight in response to seeing an oncoming vehicle, even though such averaging produces behavior that is far from optimal.

In contrast, embodiments of the present invention are directed to systems and methods which use LfD in which a multitude of tasks are demonstrated without requiring careful task set up, labeling, and engineering, and which learn multiple modes of behavior from visual data. For example, in connection with the driving demonstration described above, embodiments of the present invention would learn to turn right some of the time and to turn left some of the time to reflect these two modes in the demonstration data, instead of averaging these two modes to produce a single learned mode. The approach disclosed herein is based on a stochastic deep neural network (SNN), which represents the underlying intention in the demonstration as a stochastic activation in the network. Embodiments of the present invention include an efficient algorithm for training SNNs, and for learning with vision inputs. Embodiments of the present invention also include an architecture that associates the intention with a stochastic attention module. Furthermore, embodiments of the present invention may be trained using demonstrations of real robot visual object reaching tasks, and can reliably learn the multiple behavior modes in the demonstration data.

Figure 1:
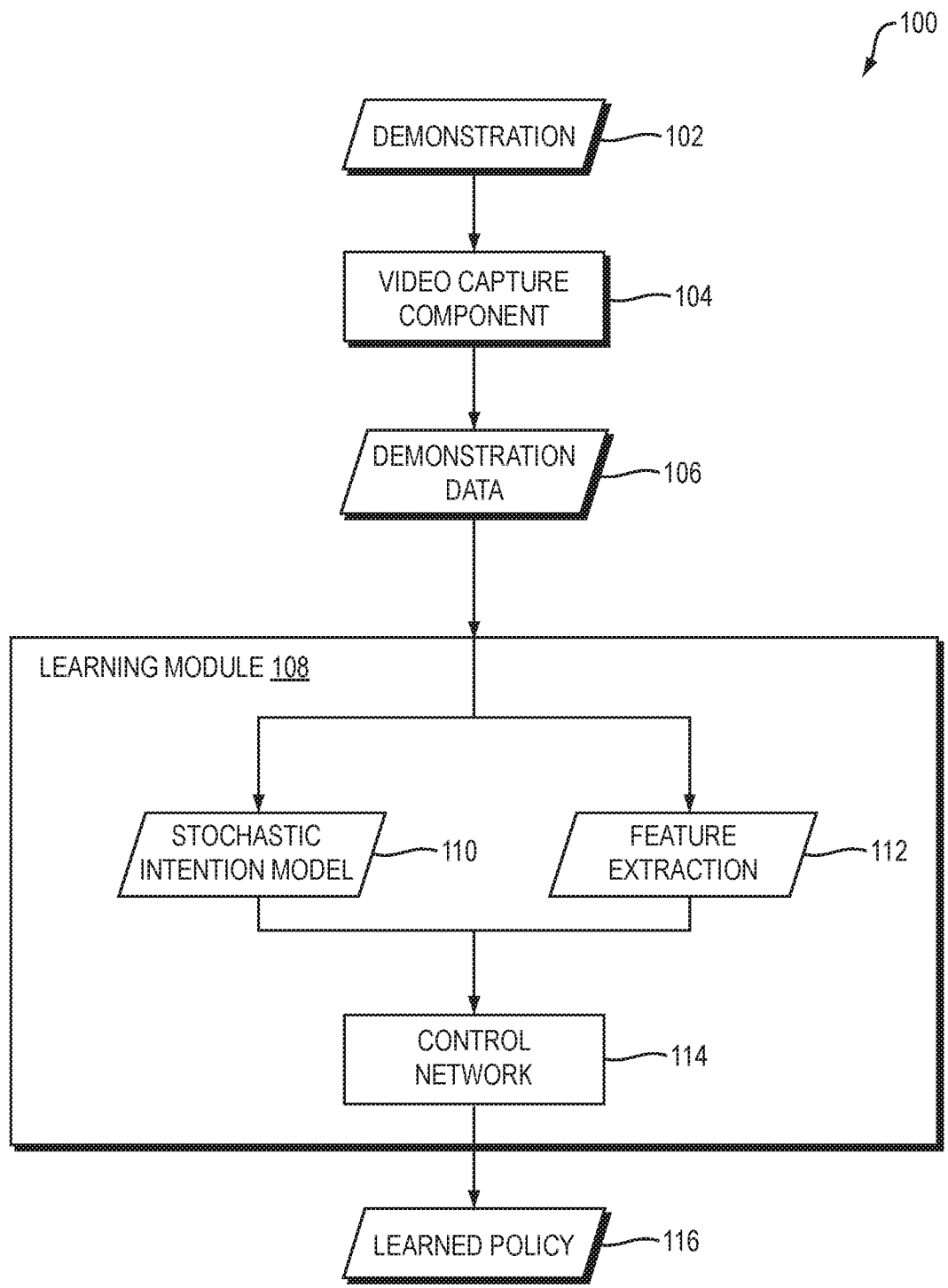
FIG. 1 is a dataflow diagram of a computerized machine learning system for learning multiple modes of behavior from visual data according to one embodiment of the present invention.
Figure 2:
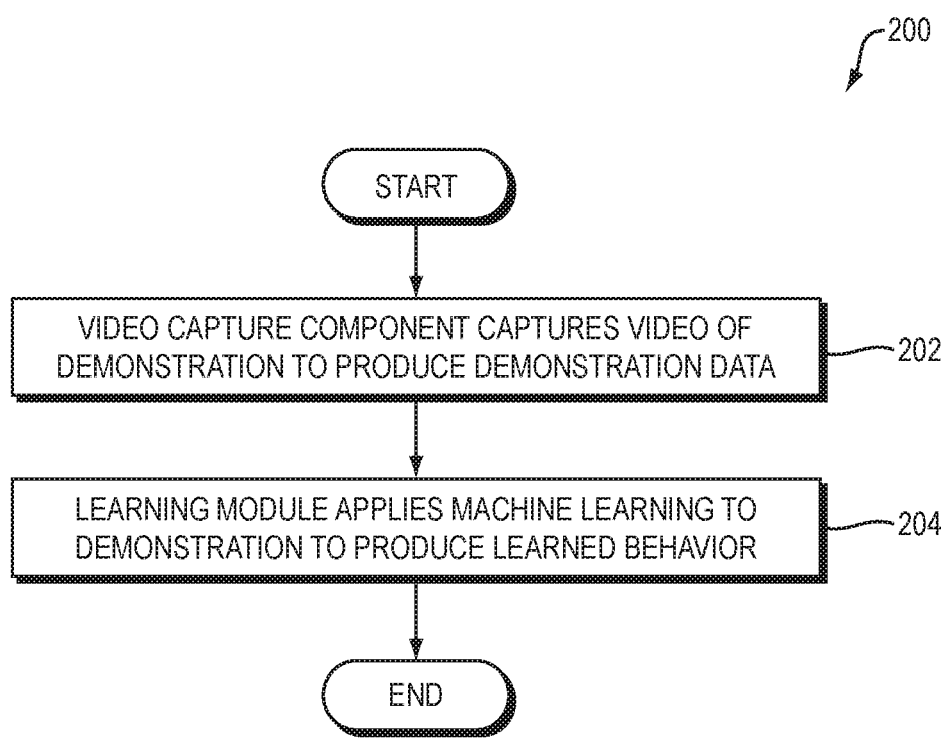
FIG. 2 is a flowchart of a method performed by the system of FIG. 1 according to one embodiment of the present invention.

Referring to FIG. 1, a dataflow diagram is shown of a computerized machine learning system 100 for learning multiple modes of behavior from visual data according to one embodiment of the present invention. Referring to FIG. 2, a flowchart is shown of a method 200 performed by the system 100 of FIG. 1 according to one embodiment of the present invention.

In high level overview, the system 100 includes a demonstration 102. The demonstration 102 is a set of physical actions, such as the actions performed by a human driver while driving a car (e.g., turning the steering wheel, depressing and releasing the accelerator pedal), or actions performed by a robot while performing one or more object reaching tasks (e.g., a robot arm attempting to reach for and grasp an object). Embodiments of the present invention may be applied to any of a variety of demonstrations; any particular demonstrations disclosed herein are merely examples and do not constitute limitations of the present invention.

The system 100 also includes a video capture component 104, such as one or more cameras. The video capture component captures visual and/or auditory data from the demonstration 102 to produce, as output, demonstration data 106 representing the demonstration 102 (FIG. 2, operation 202). The demonstration data 106 may, for example, be a (streamed and/or recorded) digital video of some or all of the demonstration 102. As this implies, the demonstration 102 may occur over time, and the resulting demonstration data 106 may include temporally-associated elements (e.g., frames of video) corresponding to the demonstration 102 at different points and/or periods in time. The temporal associations of such elements may, for example, be stored in timestamps and/or other data representing the temporal associations. The demonstration data 106 is an example of "visual data," as that term is used herein.

The system 100 also includes a learning module 108, which receives the demonstration data 106 as input, and which applies machine learning to the demonstration data 106 to produce a learned policy 116 (also referred to herein as "learned behavior data") as output (FIG. 2, operation 204). The learning module 108 may use any of a variety of machine learning techniques, either individually or in combination, to produce the learned policy 116. For example, the learning module 108 may use any of a variety of machine learning techniques which use learning from demonstrations (LfD) techniques, such as LfD techniques with deep neural networks. One example of a deep neural network that may be used by the learning module is a stochastic deep neural network (SNN), which represents the underlying intention in the demonstration data 106 as a stochastic activation in the SNN. An SNN is merely one example of a stochastic intention model 110 that the learning module 108 may use to represent the underlying intention in the demonstration data 106.

The learning module 108, as part of applying machine learning to the demonstration data 106, may identify one, two, or more behavior modes in the demonstration data 106, and may generate, in the learned policy 116, data representing such one, two, or more modes. As this implies, the learned policy 116 may include data representing multiple behavior modes in the demonstration data 106. A behavior mode may, for example, refer to a specific instantiation of a behavior. For example, assume that a particular behavior is defined as "grasping an object" from a set of red, blue, and white objects, and that some of the demonstrations involve grasping a red object, some of the demonstrations involve grasping a blue object, and some of the demonstrations involve grasping a white object. Each grasp demonstration associated with a specific object type constructs one mode of that behavior. In this example, there are three different object types (red, white, and blue), and thus there are three different modes in the demonstrated behavior, one for each object type.

Elements of FIG. 1, such as the video capture component 104 and the learning module 108, may be, contain, or be contained within one or more computer systems, as that term is used herein. A computer system, as that term is used herein, may include one or more computing devices. As used herein, the term "computer" or "computing device" refers to any device which includes at least one processor and one memory, in which instructions may be stored in the memory and executed by the processor. Examples of computing devices include, but are not limited to, servers, desktop computers, laptop computers, tablet computers, smartphones, wearable computing devices (e.g., smart watches), and appliances having at least one processor and memory in the manner just described. As used herein, the term "computer system" refers to any one or more computing devices, whether or not such computing devices are connected to each other or interoperate with each other. A computer system, therefore, as that term is used herein, may consist of a single computing device. The learning module 108 may, for example, be a computer system or may be a software application installed in a computer system, as merely two examples.

The demonstration 102 may include one or more demonstrations. As a result, the resulting demonstration data 106 may include data representing one or more demonstrations. The demonstration data 106 may, for example, include data representing a set of (possibly mixed) demonstrations solving a task or a plurality of tasks. For each demonstration in the set of demonstrations, the demonstration data 106 may include a sequence of data representing, for each of a plurality of times: (a) the current sensory inputs captured by the system 100 from the demonstration 102 using one or more sensors (e.g., current image captured by the video capture component 104, current robot joint/velocity configuration, current force-feedback of the end effector); and (b) the control signal that is/was output by the mentor to the machine(s) (e.g., robot) at that step in the sequence.

Demonstrations in the demonstration data 106 are not labeled by the tasks they solve. For example, the demonstration data 106 may not include labels representing a task or task attempted to be solved by the demonstration(s) represented by the demonstration data. For example, in prior art systems, a label for a demonstration may contain information about the specific goal that that demonstration tries to achieve. For example, demonstration data for grasping a red object may, in the prior art, be labeled by object color information representing the color red. As described in more detail below, this is a significant advantage of embodiments of the present invention, because embodiments of the present invention do not require an additional supervision step to label the demonstrations.

The learning module 108 receives the demonstration data 106, representing a plurality of demonstrations, and fits a multi-modal probabilistic model to the demonstration data 106 so that, at test time, the robot would produce a sequence of control signals, when it is presented with one of the tasks represented by the demonstration data 106, that will produce a sequence of actions using the learned model that will solve the task. The learning module 108 does not merely apply existing regression techniques to the demonstration data 106, since doing so fails to capture the multi-modality of the demonstration data 106. Instead, the learning module 108 fits a probabilistic model, having a plurality of modes, to the demonstration data 106, where each mode of the distribution in the probabilistic model is associated with a corresponding one of the tasks in the demonstration data 106, and outputs the probabilistic model in the learned policy 116. Then, at test time, sampling control signals from the probabilistic model will avoid the averaging phenomenon that often occurs using existing regression techniques.

The system 100 may include:

(1) A feature extraction component 112 in the learning module 108, which receives as input the sensory inputs (e.g., images) from the demonstration data 106 (where such sensory inputs may be high-dimensional, such as 64×64 pixel image having a dimensionality of 4096), and produces as output a set of features to be used in a downstream control network 114 (described in more detail below). Any standard stack of convolutional neural networks (CNNs) may be used to implement the feature extraction component 112. However, a variant of a CNN may be used that adds a spatial-softmax layer in which each channel at each layer may represent a coordinate of one of the objects in the current task.

(2) A stochastic intention component 110, which may be combined with the stochastic training algorithm described below. One function performed by the stochastic intention component 110 is to specify modes for representing a plurality of tasks in the demonstration data 106. The stochastic intention component 110 effectively "guesses" the goal of the presented task and configures the control network 114 to focus on that task. To achieve this, when a task in the demonstration data 106 is sampled by the feature extraction component 112 during training, the stochastic intention component 110 generates a pseudo-random number. The stochastic intention component 110 then maps this pseudo-random number (e.g., using a multi-layer perceptron) to a distribution over the set of channels of the spatial-softmax layer (see above). This distribution serves as an attention mask (which defines which area to focus on) that aims to single out one of the channels that may represent the coordinates of one of the objects. In other words, the stochastic intention component 110 learns a pseudo-random number to be mapped to one of the modes of the problem. As a result, at test time, sampling a pseudo-random number isolates the focus to only one task at a time and a desired control signal may be generated without suffering from an averaging effect.

(3) A control network 114, which receives as input the features extracted by the feature extraction component 112, applies the attention mask produced by the stochastic intention component 110 to the extracted features, and combines the product of the attention mask produced by the stochastic intention component 110 and the extracted features with the robot internal state (e.g., robot joint position/velocity information) using a multi-layer perceptron to produce the final control signal as output.

Embodiments of the present invention may use a variety of techniques to optimize sample value. For example, embodiments of the present invention may use a stochastic training algorithm, which is closely related to a stochastic feedforward neural network algorithm (SFNN), which essentially is a variant of the standard generalized Expectation-Maximization (EM) algorithm with importance sampling. The EM algorithm is a widely-used method for finding maximum likelihood estimates of parameters in statistical models and machine learning in particular, in cases where the data is partially observed, or in which part of the data is missing. For example, in embodiments of the present invention, the true intention of the demonstrator who performs the demonstration 102 is not observed and therefore needs to be inferred.

Most variants of EM algorithms iteratively maximize a lower bound on the log-likelihood of the complete data, and then use importance sampling for estimating the log-likelihood at each iteration. In contrast, embodiments of the present invention efficiently tune the contribution of samples in a way that is more controllable and is suitable for cases such as the intention architecture of embodiments of the present invention, in which only a single intention sample is relied upon at test time. More specifically, the stochastic training algorithm of embodiments of the present invention may operate as follows:

(1) Draw "n" random samples (e.g., a random intention).
(2) Conditioned on each random sample, calculate the loss over predictions associated with that sample. This essentially measures how wrong the predictions are if the true intention of the demonstrator was actually the randomly drawn sample (e.g., intention).
(3) Sort the samples according to the losses, in ascending order.
(4) Update the parameters in the direction of the gradient calculated from loss of the average of the "k" random samples with the minimum losses (i.e., essentially the first "k" elements of the sorted list above). As an example, k=1, in which case only the loss associated with the best random sample (i.e., the random sample that produced the minimum loss given the current parameters and the training data at that iteration) is used.

The results of the stochastic training algorithm just described analyze the quality of the loss estimator that was presented in the algorithm. More specifically, the results of the stochastic training algorithm connect likelihood maximization techniques (which are at the core of many machine learning algorithms) with the concepts in risk-sensitive optimization literature to show that the estimator disclosed herein is a consistent (but biased) estimator with an established variance bound. Establishing such a connection between these two areas is another novel aspect and contribution of embodiments of the present invention. These results are important because, for example, they present the tradeoffs as a result of choosing different values for "k" as explained above.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the machine learning algorithms disclosed herein may be applied to datasets containing millions of elements and perform up to millions of calculations per second. It would not be feasible for such algorithms to be executed manually or mentally by a human. Furthermore, it would not be possible for a human to apply the results of such learning to control a robot in real time.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
   (A) receiving, as input, demonstration data representing a plurality of demonstrations of a physical task, wherein the demonstration data includes visual data representing a plurality of images of the plurality of demonstrations of the physical task over time, wherein the demonstration data does not include labels associated with the physical task;
   (B) using a deep neural network to generate, based on the demonstration data, learned behavior data exhibiting multiple modes of behavior, the generating comprising:
      generating, based on the demonstration data, data representing a set of features of the demonstration data; and
      using a stochastic intention component to specify, based on the demonstration data, a plurality of modes representing the plurality of demonstrations of the physical task.

2. The method of claim 1, wherein (A) comprises capturing the plurality of images of the plurality of demonstrations of the physical task over time using at least video capture component to generate at least part of the visual data.

3. The method of claim 1, wherein (B) comprises using Learning from Demonstrations (LfD) techniques to generate the learned behavior data.

4. The method of claim 3, wherein using LfD techniques to generate the learned behavior data comprises using a stochastic deep neural network (SNN), which represents an underlying intention in the demonstration data as a stochastic activation in the SNN, to generate the learned behavior data.

5. The method of claim 1, wherein (B) comprises fitting a probabilistic model having a plurality of modes to the demonstration data, wherein a first one of the plurality of modes is associated with a first one of the plurality of demonstrations, and wherein a second one of the plurality of modes is associated with a second one of the plurality of demonstrations that is distinct from the first one of the plurality of demonstrations, and including the probabilistic model in the learned behavior data.

6. The method of claim 5, wherein fitting the probabilistic model comprises using Learning from Demonstrations (LfD) techniques fit the probabilistic model to the demonstration data.

7. The method of claim 6, wherein using LfD techniques to generate the learned behavior data comprises using a stochastic deep neural network (SNN), which represents an underlying intention in the demonstration data as a stochastic activation in the SNN, to generate the learned behavior data.

8. The method of claim 7, wherein generating the data representing the set of features comprises using a stack of convolutional neural networks (CNNs) to generate the data representing the set of features.

9. The method of claim 1, wherein (B) further comprises:
   (B) (1) receiving as input the set of features;
   (B) (2) applying an attention mask generated by the stochastic intention component to the set of features; and
   (B) (3) combining a product of the attention mask and the set of features with an internal state of a machine that performed the plurality of demonstrations of the physical task to produce a control signal as output.

10. A system comprising at least one non-transitory computer-readable medium containing computer program instructions executable by at least one computer processor to perform a method which, when executed by the at least one computer processor, causes the at least one computer processor to:
   (A) receive, as input, demonstration data representing a plurality of demonstrations of a physical task, wherein the demonstration data includes visual data representing a plurality of images of the plurality of demonstrations of the physical task over time, wherein the demonstration data does not include labels associated with the physical task;
   (B) use a deep neural network to generate, based on the demonstration data, learned behavior data exhibiting multiple modes of behavior, comprising causing the at least one computer processor to:
   generate, based on the demonstration data, data representing a set of features of the demonstration data; and
   use a stochastic intention component to specify, based on the demonstration data, a plurality of modes representing the plurality of demonstrations of the physical task.

11. The system of claim 10, wherein (A) comprises causing the at least one computer processor to capture the plurality of images of the plurality of demonstrations of the physical task over time using at least video capture component to generate at least part of the visual data.

12. The system of claim 10, wherein (B) comprises causing the at least one computer processor to use Learning from Demonstrations (LfD) techniques to generate the learned behavior data.

13. The system of claim 12, wherein causing the at least one computer processor to use LfD techniques to generate the learned behavior data comprises causing the at least one computer processor to use a stochastic deep neural network (SNN), which represents an underlying intention in the demonstration data as a stochastic activation in the SNN, to generate the learned behavior data.

14. The system of claim 10, wherein (B) comprises causing the at least one computer processor to fit a probabilistic model having a plurality of modes to the demonstration data, wherein a first one of the plurality of modes is associated with a first one of the plurality of demonstrations, and wherein a second one of the plurality of modes is associated with a second one of the plurality of demonstrations that is distinct from the first one of the plurality of demonstrations, and including the probabilistic model in the learned behavior data.

15. The system of claim 14, wherein causing the at least one computer processor to fit the probabilistic model comprises causing the at least one computer processor to use Learning from Demonstrations (LfD) techniques to fit the probabilistic model to the demonstration data.

16. The system of claim 15, wherein causing the at least one computer processor to use LfD techniques to generate the learned behavior data comprises causing the at least one computer processor to use a stochastic deep neural network (SNN), which represents an underlying intention in the demonstration data as a stochastic activation in the SNN, to generate the learned behavior data.

17. The system of claim 15, wherein causing the at least one computer processor to generate the data representing the set of features comprises causing the at least one computer processor to use a stack of convolutional neural networks (CNNs) to generate the data representing the set of features.

18. The system of claim 10, wherein (B) further comprises causing the at least one computer processor to:
(B) (1) receive as input the set of features;
(B) (2) apply an attention mask generated by the stochastic intention component to the set of features; and
(B) (3) combine a product of the attention mask and the set of features with an internal state of a machine that performed the plurality of demonstrations of the physical task to produce a control signal as output.

* * * * *